(12) United States Patent
Shokai

(10) Patent No.: US 10,209,648 B2
(45) Date of Patent: *Feb. 19, 2019

(54) IMAGE PROCESSING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takeharu Shokai, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,241

(22) Filed: Nov. 29, 2017

(65) Prior Publication Data
US 2018/0081304 A1   Mar. 22, 2018

Related U.S. Application Data

(63) Continuation of application No. 15/191,955, filed on Jun. 24, 2016, now Pat. No. 9,857,736.

(30) Foreign Application Priority Data

Nov. 20, 2015   (JP) ................. 2015-227971

(51) Int. Cl.
 *G03G 15/20* (2006.01)
 *B41M 7/00* (2006.01)
 (Continued)

(52) U.S. Cl.
 CPC ............. *G03G 15/20* (2013.01); *B41J 2/01* (2013.01); *B41J 11/0015* (2013.01);
 (Continued)

(58) Field of Classification Search
 CPC .............. G03G 15/20; G03G 21/00; G03G 2215/2038; B41J 2/01; B41J 11/00;
 (Continued)

(56) References Cited

U.S. PATENT DOCUMENTS 9,857,736 B2 * 1/2018 Shokai .............. G03G 15/20
2007/0296778 A1 12/2007 Snyder
(Continued)

FOREIGN PATENT DOCUMENTS

JP   2015-052639   3/2015

OTHER PUBLICATIONS

Extended European Search Report for European Patent Application No. 16188113.1 dated Jan. 11, 2017.
(Continued)

*Primary Examiner* — Hoang Ngo
(74) *Attorney, Agent, or Firm* — Amin, Turocy & Watson LLP

(57) ABSTRACT

In accordance with an embodiment, an image processing apparatus comprises a human sensor, a fixing device and a controller. The human sensor detects a person in the vicinity of the image processing apparatus. The fixing device carries out fixation of an image formed with a decolorable recording agent serving as a recording agent containing a coloring agent which is decolored through heating on a medium and decoloration of the image formed on the medium. The controller controls the fixing device to stop the decoloration of the image when the person is detected by the human sensor.

9 Claims, 5 Drawing Sheets

(51) Int. Cl.
*H04N 1/00* (2006.01)
*B41J 2/01* (2006.01)
*B41J 11/00* (2006.01)
*G03G 21/00* (2006.01)

(52) U.S. Cl.
CPC ........... *B41M 7/0009* (2013.01); *G03G 21/00* (2013.01); *H04N 1/00* (2013.01); *G03G 2215/2038* (2013.01)

(58) Field of Classification Search
CPC .... B41J 11/0009; B41M 7/0009; B41M 7/00; H04N 1/00
See application file for complete search history.

(56) References Cited

U.S. PATENT DOCUMENTS

| | | |
|---|---|---|
| 2013/0011149 A1 | 1/2013 | Ogasawara et al. |
| 2014/0093266 A1 | 4/2014 | Narushima et al. |
| 2015/0261159 A1 | 9/2015 | Horishita et al. |

OTHER PUBLICATIONS

Non-Final Office Action for U.S. Appl. No. 15/191,955 dated Feb. 27, 2017, 17 Pages.

\* cited by examiner

IMAGE PROCESSING APPARATUS

CROSS-REFERENCE TO RELATED APPLICATIONS

This application is a Continuation of application Ser. No. 15/191,955 filed on Jun. 24, 2016, the entire contents of which are incorporated herein by reference.

This application is based upon and claims the benefit of priority from Japanese Patent Application No. 2015-227971, filed Nov. 20, 2015, the entire contents of which are incorporated herein by reference.

FIELD

Embodiments described herein relate generally to an image processing apparatus.

BACKGROUND

Conventionally, an image forming apparatus is known which can carry out a decoloring processing on a paper printed with a recording agent (hereinafter, referred to as a "decolorable recording agent") containing a coloring agent which is decolored through heating. For example, the image forming apparatus is an MFP (Multi-Function Peripheral). However, in the foregoing image forming apparatus, a case in which the decoloring processing is being carried out at the time a user carries out a printing operation is also considered. In such a case, as the user has to wait for until the decoloring processing is ended, there is a case in which time is spent until the printing operation is started.

DETAILED DESCRIPTION

In accordance with an embodiment, an image processing apparatus comprises a human sensor, a fixing device and a controller. The human sensor detects a person in the vicinity of the image processing apparatus. The fixing device carries out fixation of an image formed with a decolorable recording agent serving as a recording agent containing a coloring agent which is decolored through heating on a medium and decoloration of the image formed on the medium. The controller controls the fixing device to stop the decoloration of the image when the person is detected by the human sensor.

Hereinafter, the image processing apparatus of the embodiment is described with reference to the accompanying drawings.

Figure 1:
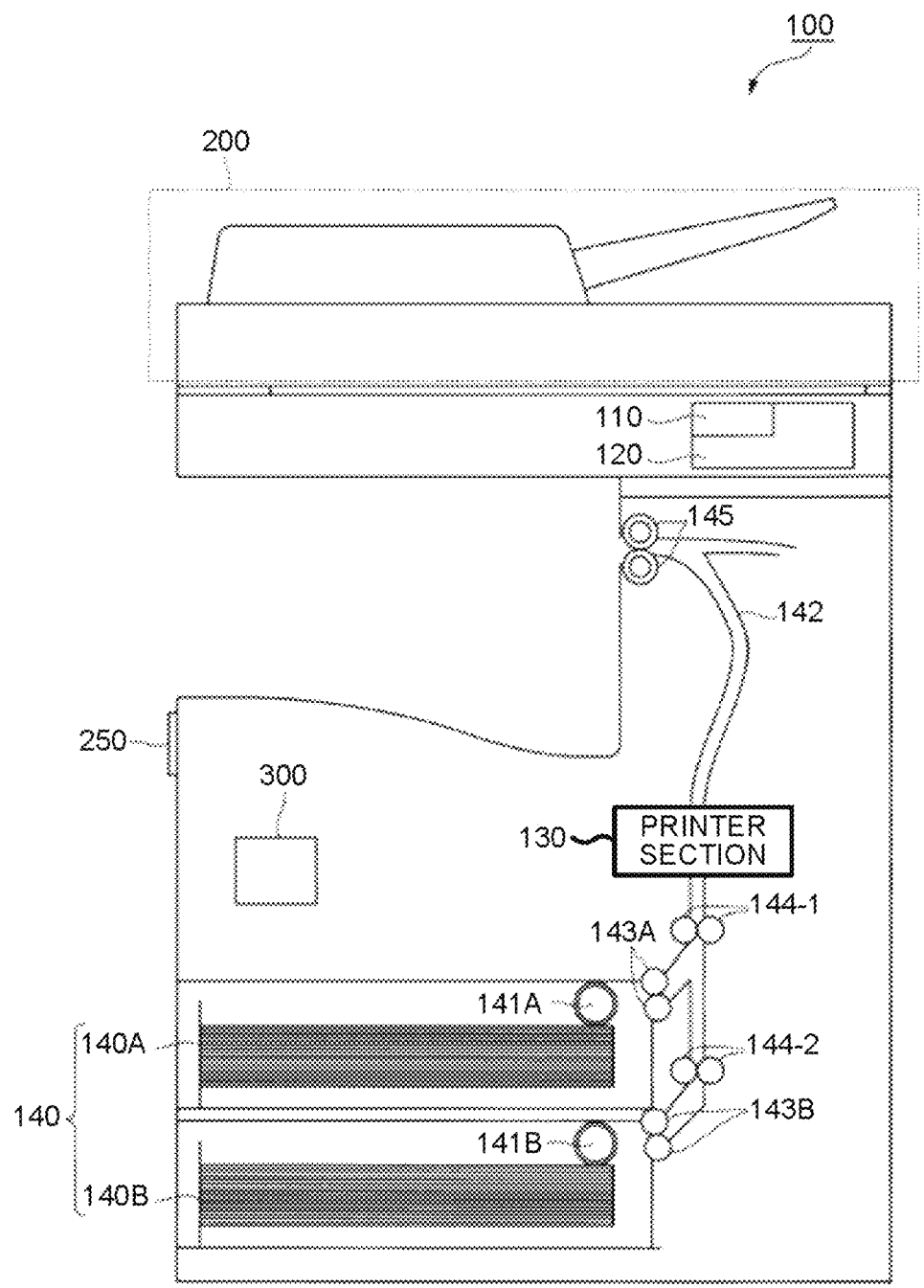
FIG. 1 is a cross-section view illustrating an image processing apparatus according to an embodiment.

FIG. 1 is a cross-section view of an image processing apparatus 100 according to the embodiment.

The image processing apparatus 100 of the embodiment can carry out an image forming processing and a decoloring processing. The image forming processing refers to a process of forming an image on a sheet. The decoloring processing refers to a process of decoloring the image formed on the sheet. The "decoloring" according to the present embodiment refers to making an image formed with a color (containing not only chromatic colors but also achromatic colors such as white, black and the like) invisible or different from a base color of the sheet. The image processing apparatus 100 is an image forming apparatus, for example, an MFP (Multi-Function Peripheral). The sheet is, for example, a document or a paper on which characters, images and the like are recorded. The sheet may be optional as long as it can be read by the image processing apparatus 100. The image processing apparatus 100 reads the image displayed on the sheet and generates digital data to generate an image file.

The image processing apparatus 100 is provided with a display 110, a control panel 120, a printer section 130, a sheet storing section 140, an image reading section 200, a human sensor 250 and a controller 300. The printer section 130 of the image processing apparatus 100 may be a device for enabling a toner image to be fixed or an inkjet type device. In the present embodiment, a case in which the printer section 130 is a device for enabling the toner image to be fixed is exemplified.

The display 110 is an image display device such as a liquid crystal display, an organic EL (Electro Luminescence) display and the like. The display 110 displays various kinds of information relating to the image processing apparatus 100.

The control panel 120 includes a plurality of buttons. The control panel 120 receives an operation of a user. The control panel 120 outputs a signal corresponding to the operation carried out by the user to the control section of the image processing apparatus 100. Further, the display 110 and the control panel 120 can be separate or both may be integrated into a single touch panel.

The printer section 130 carries out the image forming processing and the decoloring processing. In the image forming processing, the printer section 130 forms the image on the sheet on the basis of image information generated by the image reading section 200 or image information received via a communication path. In the decoloring processing, the printer section 130 decolors the image formed on the sheet through the image forming processing by heating the sheet.

The sheet storing section 140 includes a plurality of cassettes 140A and 140B. For example, in the cassette 140A, a sheet (hereinafter, referred to as a "sheet for image formation") used in the image formation is stored. For example, in the cassette 140B, a sheet (hereinafter, referred to as a "sheet to be decolored") used in the decoloring processing is stored. The cassette 140A includes a pickup roller 141A. The cassette 140B includes a pickup roller 141B. The pickup rollers 141A and 141B respectively pick up the sheets one by one from each of the cassettes 140A and 140B. The pickup rollers 141A and 141B supply the picked up sheets to a conveyance path 142. Further, in the following description, a cassette (for example, the cassette 140A) in which the sheet for image formation is stored is recorded as a cassette for image formation, and a cassette (for example, the cassette 140B) in which the sheet to be decolored is stored is recorded as a cassette for decoloration. Further, the assignment of the cassette for image formation and the cassette for decoloration of the sheet storing section 140 is properly set.

In the conveyance path 142, a paper feed roller 143A, a paper feed roller 143B, a resist roller 144-1, a resist roller 144-2 and a paper discharge roller 145 are included. The paper feed roller 143A conveys the sheet supplied by the pickup roller 141A to the resist roller 144-1. The paper feed roller 143B conveys the sheet supplied by the pickup roller 141B to the resist roller 144-2. According to the timing when a transfer section described later of the printer section 130 transfers the toner image onto the surface of the sheet, the resist rollers 144-1 and 144-2 convey the sheets to the transfer section side. The paper discharge roller 145 discharges the sheet to which the processing is carried out by the printer section 130.

As shown in FIG. 1, the conveyance path 142 in which the sheet to which the image forming processing is carried out is conveyed is identical to the conveyance path 142 in which the sheet to which the decoloring processing is carried out is conveyed. In other words, the image processing apparatus 100 cannot carry out the image forming processing and the decoloring processing simultaneously.

The image reading section 200 reads the image information to be read as light and shade of light. The image reading section 200 records the read image information. The recorded image information may be sent to other information processing apparatuses via a network. The recorded image information may be used to form the image on the sheet through the printer section 130.

The human sensor 250 detects a person in the vicinity of the image processing apparatus 100. The human sensor 250 may be arranged at any position as long as it is possible to detect the person in the vicinity of the image processing apparatus 100. Further, a detection range of the human sensor 250 is randomly set. The human sensor 250 outputs a detection result to the controller included in the image processing apparatus 100.

The controller 300 controls the image processing apparatus 100. A specific processing by the controller 300 is described later.

Figure 2:
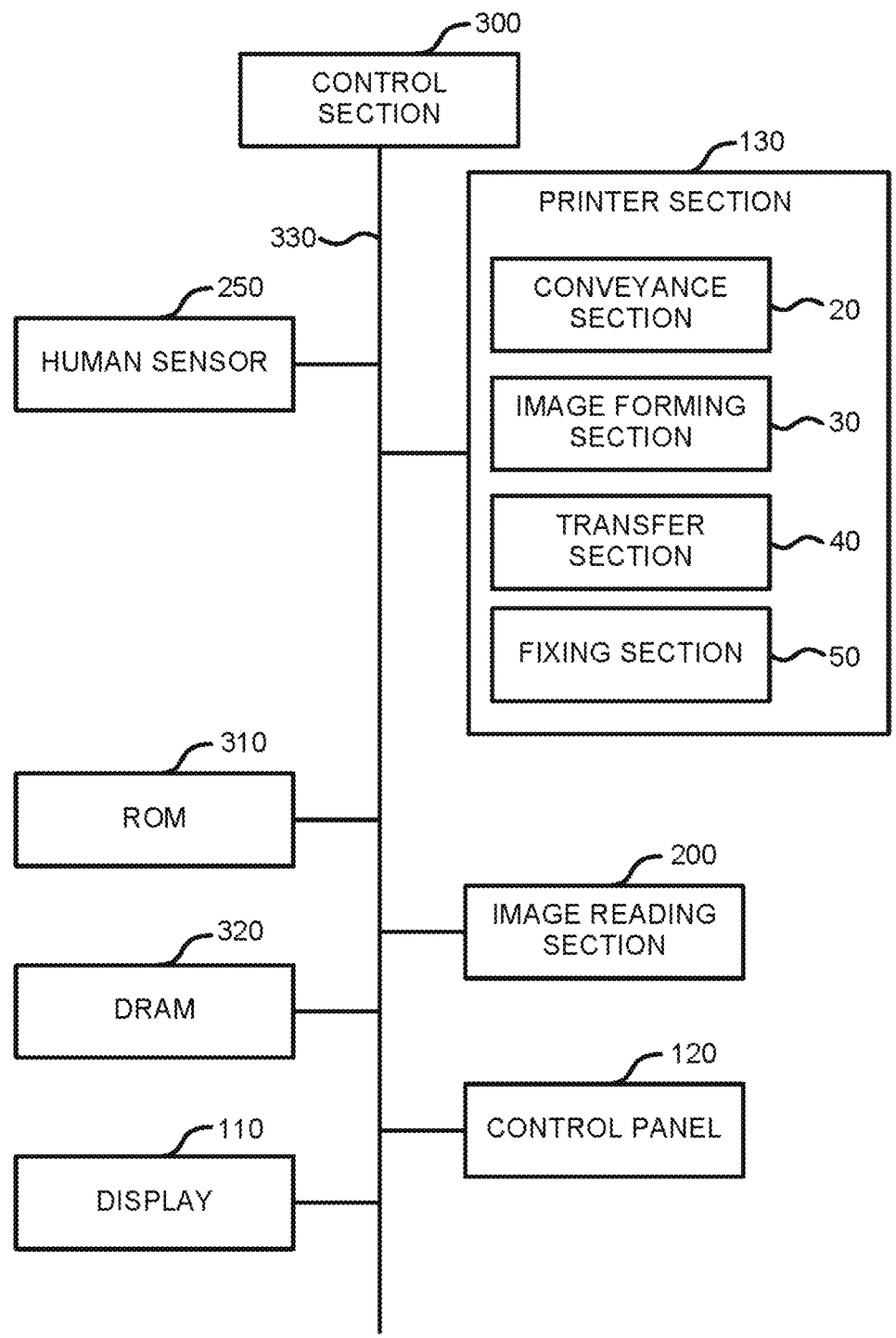
FIG. 2 is a schematic block diagram illustrating the configuration of a functional block of the image processing apparatus.

FIG. 2 is a schematic block diagram illustrating the configuration of a functional block of the image processing apparatus 100.

As shown in FIG. 2, the display 110, the control panel 120, the image reading section 200 and the human sensor 250 are described above, and thus the description thereof is omitted. Hereinafter, the printer section 130, the controller 300, a ROM 310 and a DRAM 320 are described. The functional sections are connected with one another in a data communication manner via a system bus line 330.

The printer section 130 is provided with a conveyance section 20, an image forming section 30, a transfer section 40 and a fixing device 50. The image forming processing executed by the printer section 130 is carried out as follows, for example. The conveyance section 20 takes out the sheet for image formation from the cassette for image formation of the sheet storing section 140 according to the control of the controller 300. The conveyance section 20 conveys the sheet for image formation taken out to the transfer section 40 and the fixing device 50. The image forming section 30 forms an electrostatic latent image on a photoconductive drum on the basis of the image information. The image forming section 30 enables a developing agent to be adhered on the electrostatic latent image to form a visible image. As a concrete example of the developing agent, toner is exemplified. The toner according to the present embodiment is a decolorable recording agent. The transfer section 40 transfers the visible image on the sheet for image formation. The fixing device 50 heats and pressures the sheet for image formation to enable the visible image to be fixed on the sheet for image formation. Further, the sheet for image formation on which the image is formed may be a manually fed sheet for image formation.

The decoloring processing executed by the printer section 130 is carried out as follows, for example. The conveyance section 20 takes out the sheet to be decolored from the cassette for decoloration of the sheet storing section 140. The conveyance section 20 conveys the sheet to be decolored taken out to the fixing device 50. The fixing section 50 heats and pressures the sheet to be decolored to decolor the image. The fixing device 50 heats the sheet to be decolored at a temperature higher than that at the time the image forming processing is carried out to decolor the image.

The controller 300 controls each functional section connected via the system bus line 330. Hereinafter, a specific processing of the controller 300 is described. In a case in which the person is detected by the human sensor 250 at the time of the decoloration of the image, the controller 300 controls the fixing device 50 to stop the decoloration of the image. In a case in which the person is not detected by the human sensor 250 during a first time, the controller 300 controls the fixing device 50 to carry out the decoloration of the image. After the decoloration of the image is stopped, the controller 300 controls the image processing apparatus 100 so that a printing operation can be carried out. The controller 300 carries out temperature control of the fixing device 50 and control of discharging the sheet to be decolored to which the decoloring processing is carried out as control of the image processing apparatus 100.

The ROM 310 stores various control programs necessary for the operations of the controller 300. The ROM 310 stores, for example, a program for controlling the image forming processing and the decoloring processing.

The DRAM 320 is used as a temporarily storage area of data at the time the control section 300 carries out the program.

Figure 3:
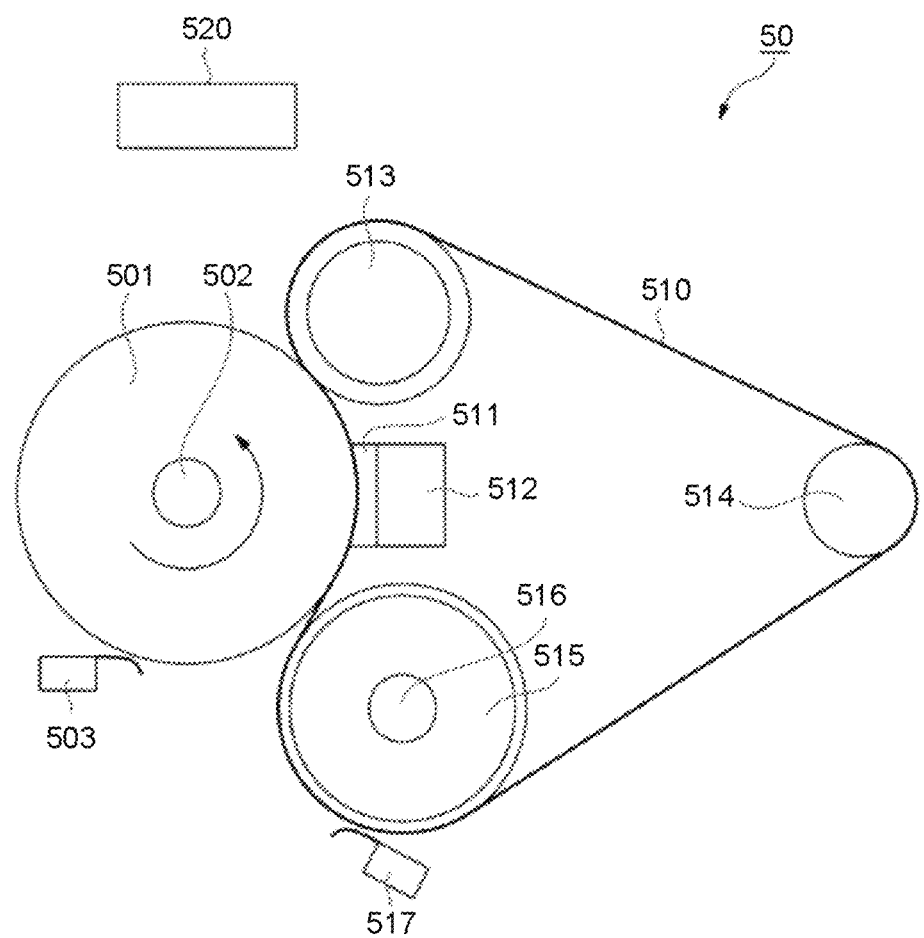
FIG. 3 is a schematic diagram illustrating a configuration example of a fixing section included in a printer section.

FIG. 3 is a schematic diagram illustrating a configuration example of the fixing device 50 included in the printer section 130. The fixing section 50 is provided with a heat roller 501, an HR lamp 502, an HR thermistor 503, a pressure belt 510, a pressure pad 511, a pad holder 512, a pressure roller 513, a tension roller 514, a belt heating roller 515, a pressure belt lamp 516, a pressure thermistor 517 and a cooling section 520.

The heat roller 501 is a fixing member formed into a cylindrical shape.

The HR lamp 502 is arranged inside the heat roller 501. The heat roller 501 is heated with the HR lamp 502 generating heat. For example, the HR lamp 502 heats the heat roller to 100 centigrade degrees when the image forming processing is carried out. For example, the HR lamp 502 heats the heat roller to 130 centigrade degrees when the decoloring processing is carried out. Further, a temperature of the HR lamp 502 is controlled by the controller 300.

The HR thermistor 503 measures a surface temperature of the heat roller 501.

The pressure belt 510 is held by the pressure roller 513, the tension roller 514 and the belt heating roller 515. The pressure belt 510 is pressure-contacted with the pressure pad 511 and the pressure roller 513. A fixing nip portion is formed between the pressure belt 510 and the heat roller 501 through the pressure contact.

The pressure pad 511 is held in a state of being pressure-contacted with the heat roller 501 via the pressure belt 510. The pad holder 512 holds the pressure pad 511 in the state of being pressure-contacted with the heat roller 501.

The pressure roller 513 is arranged at the downstream side in a conveyance direction of the sheet. The pressure roller 513 enables the pressure belt 510 to be pressure-contacted with the heat roller 501. An exit of the fixing nip portion is formed through the pressure roller 513.

The tension roller 514 is arranged at a position separate from the pressure roller 513 and the belt heating roller 515 and thus applies tension to the pressure belt 510.

The belt heating roller 515 is arranged at the upstream side in the conveyance direction of the sheet. The belt heating roller is formed into a hollow cylindrical shape.

The pressure belt lamp 516 is arranged inside the belt heating roller 515. The belt heating roller 515 is heated the pressure belt lamp 516 generating heat. The pressure belt lamp 516 is constituted by using, for example, a halogen lamp.

The pressure thermistor 517 measures a surface temperature of the pressure belt 510 nearby the belt heating roller 515.

The cooling section 520 cools the heat roller 501. Since the heat roller 501 is cooled by the cooling section 520, the surface temperature thereof reaches a low temperature more quickly when compared with a case in which the heat roller 501 is not cooled. The cooling section 520 may be any configuration as long as it is possible to cool the heat roller 501. The cooling section 520 may be, for example, a blower for supplying air to the heat roller 501 through a fan rotated by a motor.

Figure 4:
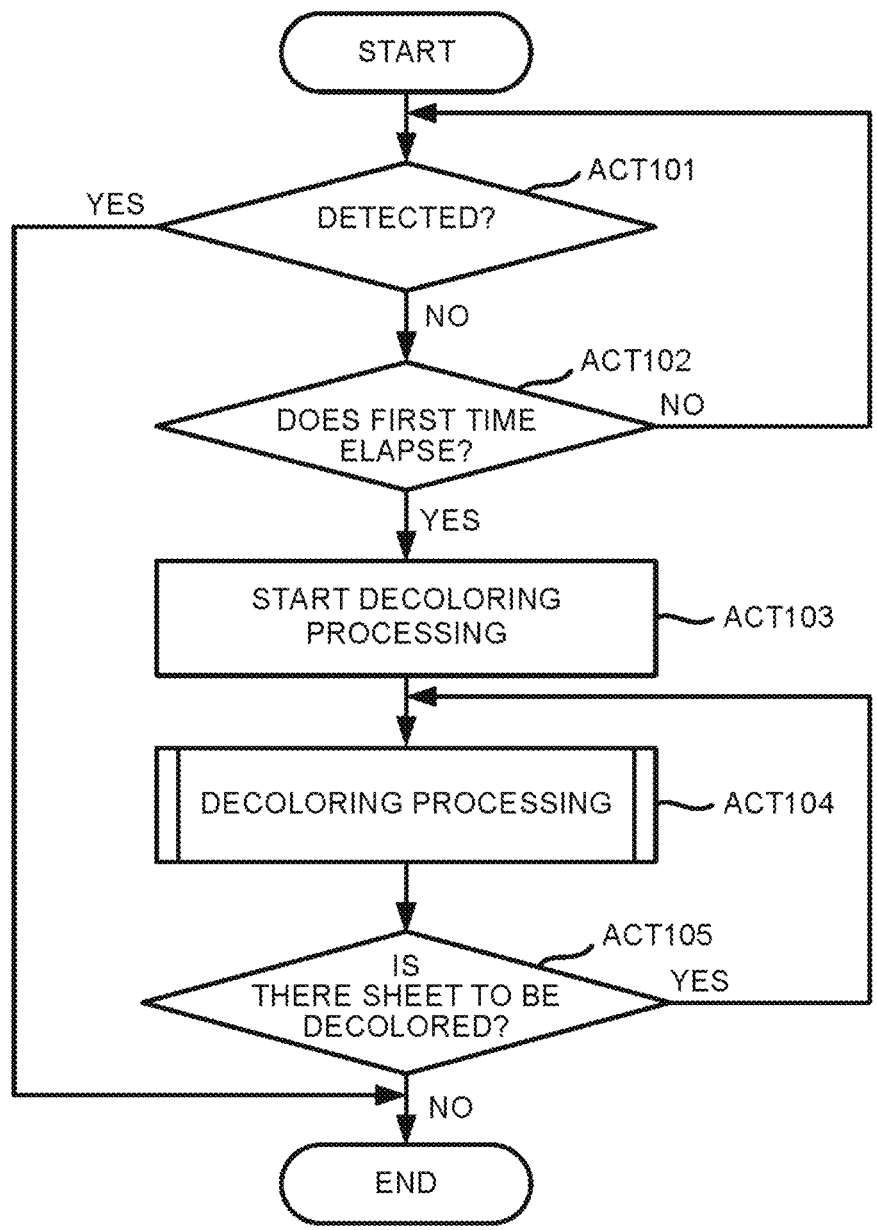
FIG. 4 is a flowchart illustrating the flow until a decoloring processing of the image processing apparatus is started.

FIG. 4 is a flowchart illustrating the flow of the processing of the image processing apparatus 100. Further, the processing in FIG. 4 is carried out, for example, at a timing when a certain number of sheets are accumulated in a decoloration object tray or at a timing becoming a preset time. Further, the processing in FIG. 4 may be carried out at any timing when the decoloring processing is not carried out, other than the foregoing timing.

The controller 300 determines whether or not the person is detected by the human sensor 250 (ACT 101). The determination of the detection or non-detection of the person by the human sensor 250 is carried out according to whether or not there is an output from the human sensor 250. In a case in which there is the output from the human sensor 250, the controller 300 determines that the person is detected by the human sensor 250. On the other hand, in a case in which there is no output from the human sensor 250, the control section 300 determines that the person is not detected by the human sensor 250. In a case in which the person is detected by the human sensor 250 (YES in ACT 101), the image processing apparatus 100 ends the processing in FIG. 4.

On the other hand, in a case in which the person is not detected by the human sensor 250 (NO in ACT 101), the controller 300 determines whether or not the first time elapses (ACT 102). More specifically, the controller 300 determines whether or not the first time elapses from the time when the person is not detected initially after the start of the processing in FIG. 4. In a case in which the first time does not elapse (NO in ACT 102), the image processing apparatus 100 returns to the processing in ACT 101 and executes the processing subsequent to ACT 101.

On the other hand, in a case in which the first time elapses (YES in ACT 102), the image processing apparatus 100 starts the decoloring processing (ACT 103). The control section 300 controls the fixing device 50 to carry out the decoloring processing (ACT 104). For example, in a case in which the decoloring processing is carried out, the controller 300 enables the temperature of the heat roller 501 to rise. The temperature of the heat roller 501 rises to a temperature (for example, 130 centigrade degrees) necessary for carrying out the decoloring processing.

Afterwards, the controller 300 determines whether or not there is the sheet to be decolored (ACT 105). In a case in which there is no sheet to be decolored in the cassette for decoloration, the controller 300 determines that there is no sheet to be decolored. On the other hand, in a case in which there is the sheet to be decolored in the cassette for decoloration, the controller 300 determines that there is the sheet to be decolored. In a case in which there is no sheet to be decolored (NO in ACT 105), the image processing apparatus 100 ends the processing.

On the other hand, in a case in which there is the sheet to be decolored (YES in ACT 105), the control section 300 returns to the processing in ACT 104 and executes the processing subsequent to ACT 104.

Figure 5:
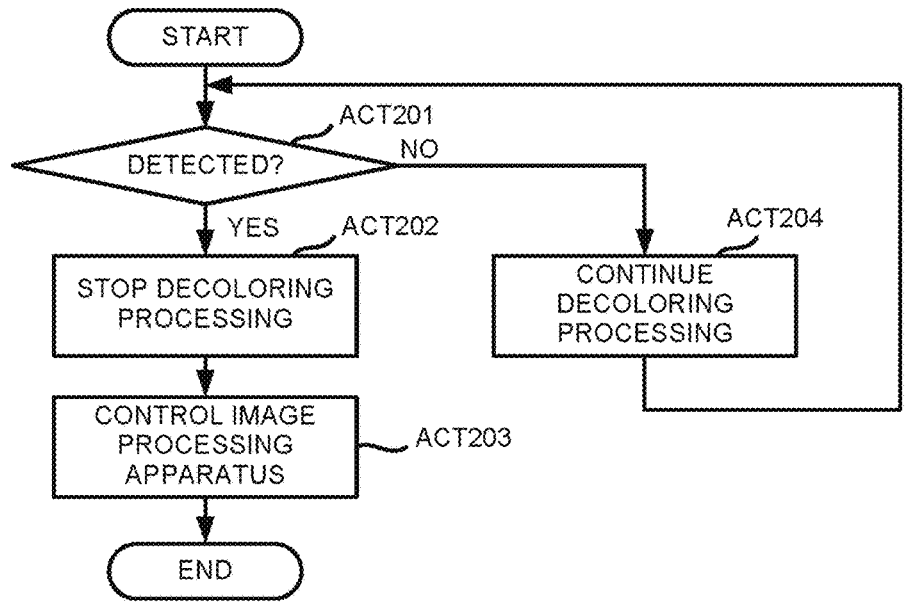
FIG. 5 is a flowchart illustrating the flow of the decoloring processing of the image processing apparatus.

FIG. 5 is a flowchart illustrating the flow of the processing in the decoloring processing (ACT 104) of the image processing apparatus. Further, the processing in FIG. 5 is carried out, for example, at a timing when the decoloring processing is started or every time a predetermined time elapses after a decoloring operation is started. Further, the processing in FIG. 5 may be carried out at any timing, when the decoloring processing is being carried out, other than the foregoing timing.

The controller 300 determines whether or not the person is detected by the human sensor 250 (ACT 201). In a case in which the person is detected by the human sensor 250 (YES in ACT 201), the controller 300 controls the fixing section 50 to stop the decoloring processing (ACT 202). Specifically, the controller 300 stops the HR lamp 502 to stop the heating to the heat roller 501. Alternatively, the control section 300 may lower electric power supplied to the HR lamp 502 to stop the decoloring processing without stopping the HR lamp 502.

Then, the controller 300 controls the image processing apparatus 100 so that the printing operation can be carried out (ACT 203). Specifically, the control section 300 controls the conveyance section 20 to discharge the sheet to be decolored on which the decoloring processing is carried out. Further, the controller 300 controls the cooling section 520 to carry out a cooling processing for the fixing device 50. The controller 300 carries out the cooling processing as follows. At first, the controller 300 controls the cooling section 520 to operate. Through such a processing, the surface temperature of the heat roller 501 is reduced. The control section 300 acquires the surface temperature of the heat roller 501 on the basis of the output of the HR thermistor 503. If the surface temperature of the heat roller 501 is reduced to a temperature equal to or smaller than a predetermined threshold value, the control section 300 ends the cooling processing. The predetermined threshold value of the surface temperature, for example, is a temperature (for example, 100 centigrade degrees) serving as a target temperature to which the heat roller 501 is heated when the image forming processing is carried out.

Further, in the processing in ACT 201, in a case in which the person is detected not by the human sensor 250 (NO in ACT 201), the image processing apparatus 100 continues the decoloring processing.

According to the image processing apparatus 100 constituted as stated above, it is possible to reduce time needed until the start of the printing operation. Hereinafter, the effect is described in detail.

If the person is detected by the human sensor 250 in the decoloring processing, the image processing apparatus 100 stops the decoloring processing that is being carried out at present. In this way, when the user carries out the printing operation, the decoloring processing is not carried out. Thus, the user can operate the image processing apparatus 100 to immediately carry out the printing operation. In this way, it is possible for the image processing apparatus 100 to reduce the time needed until the start of the printing operation.

Further, in a case in which the person is not detected by the human sensor 250 during first time, the controller 300 controls the fixing device 50 to carry out the decoloring processing. That the person is not detected during a certain time occurs with a high possibility that there is no person in the vicinity of the image processing apparatus 100. Thus, in a case in which the person is not detected during the first time, the image processing apparatus 100 does not have to stop the decoloring processing through carrying out the decoloring processing. Thus, through the stop, it is possible to decrease processing loads caused by often carrying out the decoloring processing on the same sheet.

Further, after the decoloration of the image is stopped, the controller 300 controls the image processing apparatus 100 so that the printing operation can be carried out. As to reasons of the stop of the decoloration of the image, a case in which the person is detected by the human sensor 250 is considered. In other words, it is considered that the person exists in the vicinity of the image processing apparatus 100. Therefore, the user can instantly start the printing operation in such a manner that the controller 300 controls the image processing apparatus 100 so that the printing operation can be carried out after the decoloration of the image is stopped. In this way, it is possible to reduce the time needed until the start of the printing operation.

The controller 300 carries out the temperature control of the fixing device 50 and the control of discharging the sheet to which the decoloring processing is carried out as the control of the image processing apparatus 100. Specifically, the controller 300 controls the cooling section 520 to reduce the temperature of the fixing device 50 to a temperature suitable to the printing operation. In this way, it is possible to reduce the time needed for the temperature adjustment when the user carries out the printing operation. Further, the control section 300 enables the sheet to which the decoloring processing is carried out to be discharged once. In this way, no sheet to which the decoloring processing is stopped remains inside the image processing apparatus 100. Thus, the sheet used by the user at the time of the printing and the sheet to which the decoloring processing is carried out are not discharged together. Thus, the probability that the user takes the sheet to which the decoloring processing is carried out by mistake can be reduced.

Hereinafter, a modification of the image processing apparatus 100 is described.

Figure 6:
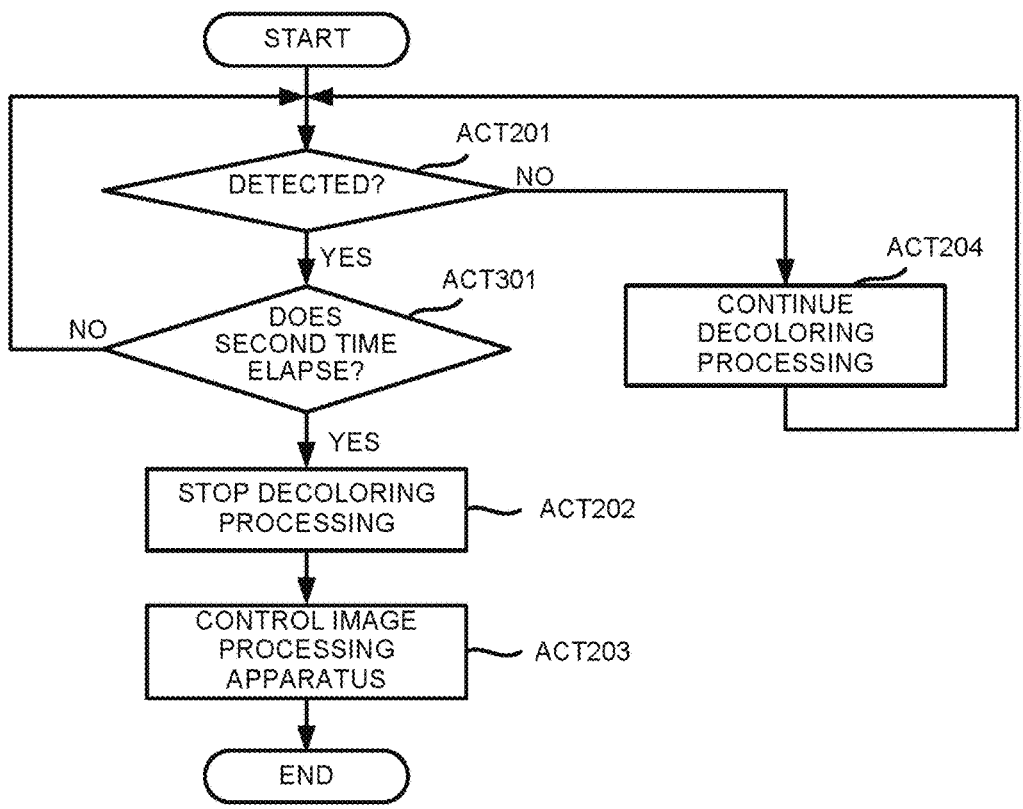
FIG. 6 is a flowchart illustrating the flow of another processing in the decoloring processing of the image processing apparatus.

In the present embodiment, in a case in which the person is detected by the human sensor 250 in the decoloring processing, it is described that the decoloring processing is stopped; however, the image processing apparatus 100 may operate as follows. For example, in a case in which the person is detected by the human sensor 250 during a second time, the image processing apparatus 100 controls the fixing device 50 to stop the decoloring processing. FIG. 6 is a flowchart illustrating the flow of another processing in the decoloring processing of the image processing apparatus 100. The same processing in FIG. 6 is applied with the same reference numerals as FIG. 5, and the description thereof is omitted.

In the processing in ACT 201, in a case in which the person is detected (YES in ACT 201), the controller 300 determines whether or not the second time elapses (ACT 301). More specifically, the control section 300 determines whether or not the second time elapses from the time when the person is detected initially after the start of the processing in FIG. 5. In a case in which the second time does not elapse (NO in ACT 301), the image processing apparatus 100 returns to the processing in ACT 201 and executes the processing subsequent to ACT 201.

On the other hand, in a case in which the second time elapses (YES in ACT 301), the image processing apparatus 100 carries out the processing in ACT 202 and the processing subsequent to ACT 202.

Through being constituted as stated above, the processing loads of the image processing apparatus 100 can be reduced. Specifically, the controller 300 stops the decoloring processing and carries out the control in a state in which the printing operation is possible each time the person is detected. In other words, if the person is detected even if the person who has no print purpose passes through the front of the image processing apparatus 100, the control is carried out. Thus, the processing loads of the image processing apparatus 100 are increased each time the person who has no print purpose often passes through the front of the image processing apparatus 100. In contrast, through being constituted as FIG. 6, the image processing apparatus 100 does not stop the decoloring processing and carry out the control in a state in which the printing operation is possible each time the person is detected. Thus, the processing loads of the image processing apparatus 100 can be decreased.

In a case in which a plurality of discharge destinations of the sheets is arranged in the image processing apparatus 100, the controller 300 may carry out the following processing. In this case, the controller 300 enables the sheet to be decolored and the sheet for image formation to be discharged to different discharge destinations.

The controller 300 may carry out the following control other than the foregoing control as the control of the image processing apparatus 100 after the decoloring processing is stopped. For example, the controller 300 may enable the display 110 to display the image subjected to the printing.

The image processing apparatus 100 may be constituted in such a way as to include two fixing sections composed of a fixing section for fixation and a fixing device for decoloring.

A part of functions of the image processing apparatus 100 according to the foregoing embodiment may be realized by a computer. In this case, programs for realizing the functions are recorded in a computer-readable recording medium. Then, the programs recorded in the computer-readable recording medium for recording the foregoing programs may be realized by being read into a computer system and executed. Further, it is assumed that the "computer system" described herein contains an operating system or hardware such as peripheral devices. Further, the "computer-readable recording medium" refers to a portable medium or a storage device. The portable medium is a flexible disc, a magneto-optical disk, a ROM, a CD-ROM and the like. Further, the storage device is a hard disk built in the computer system.

Furthermore, the "computer-readable recording medium" refers to a medium for dynamically holding the programs for a short time like a communication wire in a case in which the programs are sent via a communication line. The communication line is a network such as the Internet or a telephone line. The "computer-readable recording medium" may be a volatile memory in the computer system serving as a server and a client. The volatile memory holds the programs for a certain time. The foregoing programs may realize a part of the above-mentioned functions. Further, the foregoing program may be realized by the combination of the above-mentioned functions with the programs already recorded in the computer.

According to at least one embodiment described above, the image processing apparatus 100 comprises the human sensor 250, the fixing device 50 and the controller 300. The human sensor 250 detects the person in the vicinity of the image processing apparatus 100. The fixing device 50 carries out the fixation of the image formed with the decolorable recording agent on a medium and the decoloration of the image formed on the medium. The controller 300 controls the fixing section to stop the decoloration of the image in a case in which the person is detected by the human sensor 250 in the decoloration of the image. The image processing apparatus 100 includes the foregoing functional sections to be capable of reducing the time needed until the start of the printing operation.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
a human sensor configured to detect a person in the vicinity of the image processing apparatus;
a fixing device configured to carryout fixation of an image formed on a medium with a decolorable recording agent serving as a recording agent containing a coloring agent which is decolorable through heating on the medium and to heat the medium for decoloration of the image formed on the medium;
a conveyance section configured to convey and discharge the medium; and
a controller configured to control to lower the electric power supplied to the fixing device for stopping the decoloration of the image when a person is detected by the human sensor, the controller configured to control the conveyance section to discharge the medium after the controller controlled to have lowered the electric power supplied to the fixing device.

2. The image processing apparatus according to claim 1, wherein
the controller controls the fixing device to carry out the decoloration of the image when a person is not detected by the human sensor during a first time.

3. The image processing apparatus according to claim 1, wherein
the controller controls the fixing device to carry out the decoloration of the image when a person is detected by the human sensor during a second time.

4. The image processing apparatus according to claim 1, wherein
the controller carries out temperature control of the fixing device and controls discharging the medium to which the decoloring processing is carried out.

5. An image processing method, comprising:
fixing an image formed on a medium with a decolorable recording agent serving as a recording agent containing a coloring agent which is decolorable through heating on the medium;
heating the medium for decoloration of the image formed on the medium;
detecting a person in the vicinity of an image processing apparatus;
lowering the electric power supplied when a person is detected; and
discharging the medium after lowered the electric power supplied.

6. The image processing method according to claim 5 further comprising:
conducting a printing operation after stopping the decoloration.

7. The image processing method according to claim 5 further comprising:
conducting a copying operation after stopping the decoloration.

8. An image processing apparatus, comprising:
a human sensor configured to detect a person existing in a predefined area which is defined with reference to the image processing apparatus;
a fixing device configured to carry out fixation of an image formed on a medium with a decolorable recording agent serving as a recording agent containing a coloring agent which is decolorable through heating on the medium and to heat the medium for decoloration of the image formed on the medium;
a cooling section configured to cool the fixing device; and
a controller configured to control to lower the electric power supplied to the fixing device to stop heating the decoloration of the image when a person is detected by the human sensor during decoloration of the image, and control the cooling section to cool the fixing device.

9. The image processing apparatus according to claim 8, wherein
the controller stops driving the cooling section when the temperature of the fixing device reaches a predetermined threshold.

* * * * *